(12) United States Patent
Sato et al.

(10) Patent No.: US 10,989,988 B2
(45) Date of Patent: Apr. 27, 2021

(54) LID GUIDE MECHANISM AND IMAGING DEVICE

(71) Applicant: Panasonic Intellectual Property Management Co., Ltd., Osaka (JP)

(72) Inventors: Tatsuya Sato, Osaka (JP); Shusaku Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 202 days.

(21) Appl. No.: 16/172,746

(22) Filed: Oct. 27, 2018

(65) Prior Publication Data

US 2019/0137849 A1 May 9, 2019

(30) Foreign Application Priority Data

Nov. 9, 2017 (JP) .............................. JP2017-216692

(51) Int. Cl.
*G03B 17/02* (2021.01)

(52) U.S. Cl.
CPC .................... *G03B 17/02* (2013.01)

(58) Field of Classification Search
CPC ......... G03B 17/02; B65D 43/20; B65D 43/18
USPC ........ 220/811, 812, 813, 815, 816, 823, 824
See application file for complete search history.

(56) References Cited

U.S. PATENT DOCUMENTS

| 3,432,967 A * | 3/1969 | Simon .................... G03B 17/02 220/326 |
| 5,520,313 A | 5/1996 | Toshihide |
| 6,409,042 B1 * | 6/2002 | Hirano ................. H05K 5/0221 220/812 |
| 6,669,258 B1 | 12/2003 | Kato |
| 2001/0052524 A1 * | 12/2001 | Ichimaru ................ B60N 2/793 220/815 |
| 2002/0186978 A1 | 12/2002 | Tanaka |

FOREIGN PATENT DOCUMENTS

| JP | H06-069002 U | 9/1994 |
| JP | 2002-362602 A | 12/2002 |
| JP | 2003-276515 A | 10/2003 |

* cited by examiner

*Primary Examiner* — Don M Anderson
(74) *Attorney, Agent, or Firm* — Renner, Otto, Boisselle & Sklar, LLP

(57) ABSTRACT

Lid guide mechanism of this disclosure include lid body which slidingly moves between first position and second position which are adjacent to support base, and urging member. Support base includes attachment part to which first end part of urging member is attached, and locking part. Lid body includes first shaft part to which second end part of urging member is attached, and second shaft part which is provided at a position closer to attachment part than first shaft part and which is to be locked on locking part at first position. When lid body is moved, by external force, to third position more distant from second position than first position against urging force of urging member so that locking state between second shaft part and locking part is released and when external force is then released, lid body is moved to second position by urging force of urging member.

11 Claims, 17 Drawing Sheets

LID GUIDE MECHANISM AND IMAGING DEVICE

BACKGROUND

1. Technical Field

The present disclosure relates to a lid guide mechanism and an imaging device including the lid guide mechanism.

2. Related Art

Conventionally, as a lid guide mechanism of this type, the lid guide mechanisms disclosed in JP 2002-362602 A and JP 2003-276515 A are known, for example.

JP 2002-362602 A discloses a lid guide mechanism in which a slide knob provided on a main body is made to slide so that a cam follower provided on the slide knob moves in a cam groove provided in the lid, whereby the cam follower pushes the lid body in an opening direction by an action of the cam groove.

JP 2003-276515 A discloses a lid guide mechanism in which sliding movement and rotational movement of a lid body with respect to a support base is guided by combination of three guide protrusions, two guide grooves, and two branch grooves.

In imaging devices such as a camera, a detachable battery is generally used as a power source. In order to attach and detach this battery from and to the device for charging, replacement, and other purposes, a lid body covering the battery is opened and closed.

On the other hand, in recent years, imaging devices in which a built-in battery is used as a power source and is charged through USB (Universal Serial Bus) have been widely spread. In this type of imaging device, compared with the case of using a removable battery, the lid body is opened much more frequently.

In the lid guide mechanism of JP 2002-362602 A, the lid body can be opened by only sliding the slide knob. However, since the lid body is rotatably connected to a main body via a hinge shaft, the lid body may become an obstacle when a USB is connected to a terminal on the main body.

In contrast, according to the lid guide mechanism of JP 2003-276515 A, the lid body is housed inside a support base. Therefore, it is possible to prevent the lid body from becoming an obstacle when the lid body is opened. However, since it is necessary to slidingly move and rotate the lid body, the operation and configuration for opening the lid body are complicated.

SUMMARY

An object of the present disclosure is directed to solve the above problem and to provide a lid guide mechanism with which an opening operation of the lid body can be more easily performed and the opened lid body is prevented from obstructing other operations.

A lid guide mechanism of the present disclosure includes:
a support base;
a lid body which slidingly moves between a first position and a second position which are adjacent to the support base;
an urging member which urges the lid body from the first position toward the second position,
wherein the support base includes: an attachment part to which a first end part of the urging member is attached; and a locking part, the lid body includes: a first shaft part to which a second end part of the urging member is attached; and a second shaft part which is provided at a position closer to the attachment part than the first shaft part and which is to be locked on the locking part at the first position, and when the lid body is moved, by an external force, to a third position more distant from the second position than the first position against an urging force of the urging member so that a locking state between the second shaft part and the locking part is released and when the external force is then released, the lid body is moved to the second position by the urging force of the urging member.

With the lid guide mechanism of the present disclosure, the lid body can be more easily opened, and the opened lid body is prevented from obstructing other operations.

DESCRIPTION OF EMBODIMENTS

Figure 1:
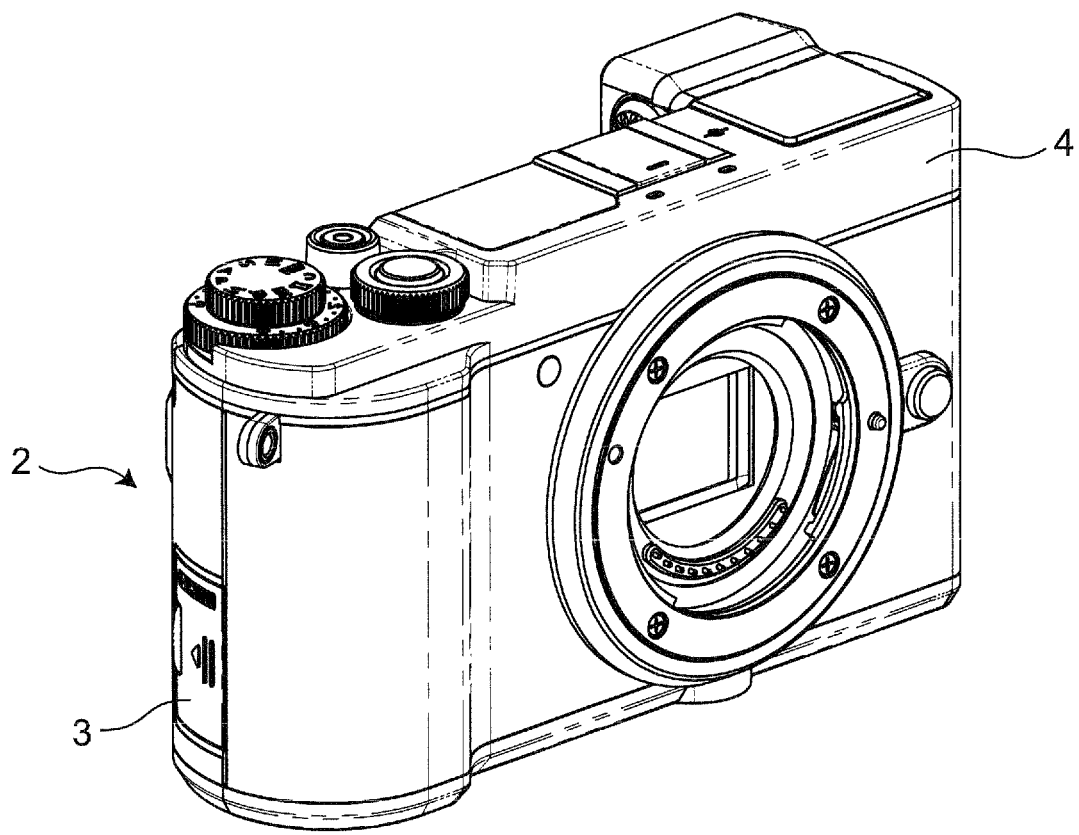
FIG. 1 is a perspective view, viewed from a front side, of an imaging device including a lid guide mechanism according to an embodiment.

According to a first aspect of the present disclosure, there is provided a lid guide mechanism including:

a support base;

a lid body which slidingly moves between a first position and a second position which are adjacent to the support base;

an urging member which urges the lid body from the first position toward the second position, wherein the support base includes: an attachment part to which a first end part of the urging member is attached; and a locking part, the lid body includes: a first shaft part to which a second end part of the urging member is attached; and a second shaft part which is provided at a position closer to the attachment part than the first shaft part and which is to be locked on the locking part at the first position, and when the lid body is moved, by an external force, to a third position more distant from the second position than the first position against an urging force of the urging member so that a locking state between the second shaft part and the locking part is released and when the external force is then released, the lid body is moved to the second position by the urging force of the urging member.

According to a second aspect of the present disclosure, there is provided the lid guide mechanism of the first aspect, wherein when the lid body is moved, by an external force, from the second position to the third position against the urging force of the urging member and when the external force is then released, the lid body is moved to the first position by the urging force of the urging member.

According to a third aspect of the present disclosure, there is provided the lid guide mechanism of the first or second aspect, wherein when the lid body is at the first position, the lid body is flush or substantially flush with an outer surface of the support base, and when the lid body is at the second position, the lid body is housed inside the support base except a part on a first shaft part side.

According to a fourth aspect of the present disclosure, there is provided the lid guide mechanism of any one of the first to third aspects, wherein the locking part extends parallel or substantially parallel to a moving direction of the lid body from the first position to the third position, and the locking part includes a support surface which supports the second shaft part from inside of the support base.

According to a fifth aspect of the present disclosure, there is provided the lid guide mechanism of any one of the first to fourth aspects, wherein the support base includes:

a first guide groove which guides the first shaft part and the second shaft part so that the lid body moves between the second position and the third position; and a second guide groove which branches from the first guide groove and extends to the locking part, and guides the second shaft part so that the lid body moves between the first position and the third position.

According to a sixth aspect of the present disclosure, there is provided the lid guide mechanism of the fifth aspect, wherein the second guide groove branches from the first guide groove in a vicinity of a region in which the second shaft part is located when the lid body is at the third position.

According to a seventh aspect of the present disclosure, there is provided the lid guide mechanism of the fifth or sixth aspect, wherein the second guide groove is provided inside, in the support base, of the outer surface of the support base, and the first guide groove is provided inside, in the support base, of the second guide groove.

According to an eighth aspect of the present disclosure, there is provided the lid guide mechanism of any one of the fifth to seventh aspects, wherein when the lid body moves from the second position to the third position, the first guide groove moves the second shaft part outside, with respect to the support base, of the urging member.

According to a ninth aspect of the present disclosure, there is provided the lid guide mechanism of any one of the fifth to eighth aspects, wherein the lid body includes a projection part projecting on a side more distant from the attachment part than the first shaft part, the projection part rotates around the first shaft part by being moved from the second position to the third position against the urging force of the urging member while being pressed toward inside of the support base, and the second shaft part moves from the first guide groove to the second guide groove.

According to a tenth aspect of the present disclosure, there is provided the lid guide mechanism of the ninth aspect, wherein an outer surface of the lid body is curved so that the outer surface of the lid body is flush or substantially flush with a curved surface constituting a part of the outer surface of the support base.

According to an eleventh aspect of the present disclosure, there is provided an imaging device comprising the lid guide mechanism of any one of the first to tenth aspects.

Hereinafter, an embodiment will be described in detail by appropriately referring to the drawings. However, a description which is more than necessary will be omitted in some cases. For example, a detailed description of already known matters and a redundant description of substantially the same configuration will be omitted in some cases. The omission is carried out to facilitate the understanding of those skilled in the art, by avoiding the following descriptions becoming unnecessarily redundant.

The appended drawings and the following descriptions are provided for those skilled in the art to sufficiently understand the present disclosure. The appended drawing and the following descriptions are not intended to limit the subject described in claims.

In the following description, for the sake of convenience of description, terms indicating directions such as "up", "down", "front", "rear", and the like are used assuming a state of normal use, but the terms do not limit how the imaging device of the present disclosure should be used or the like.

(Embodiment)

Figure 2:
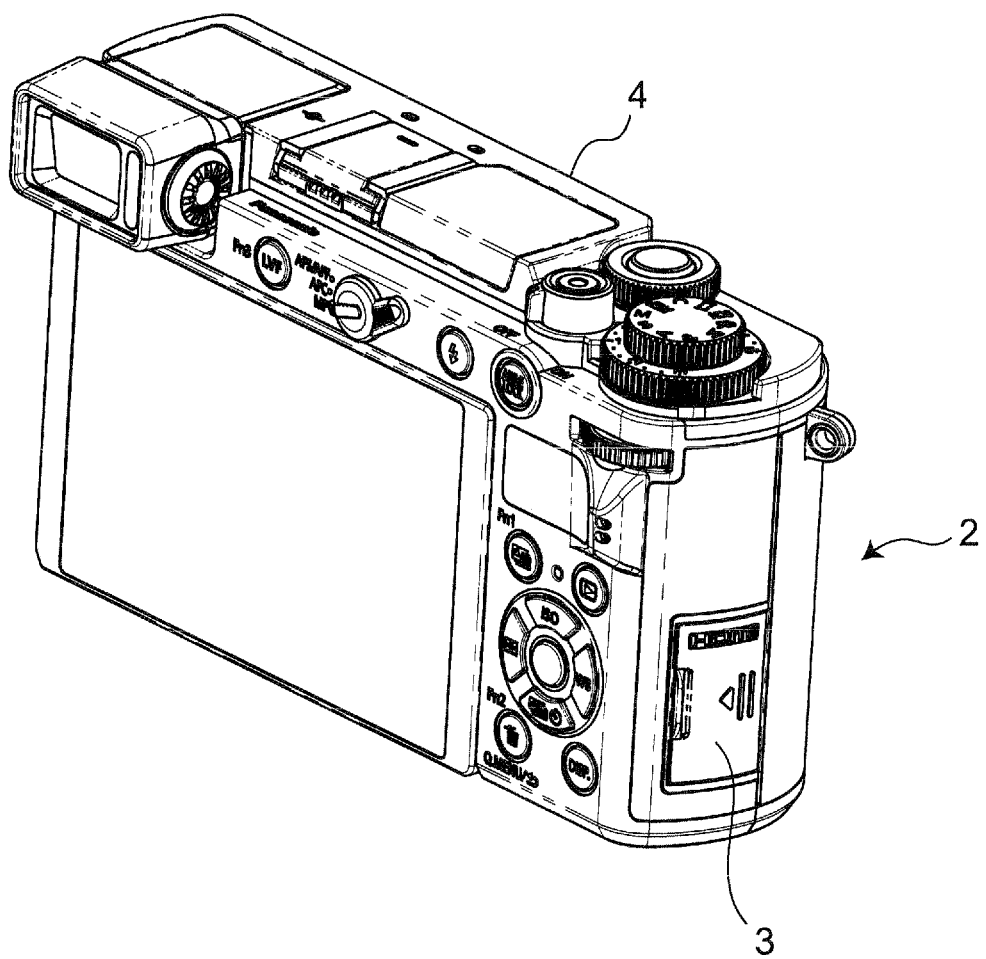
FIG. 2 is a perspective view of the imaging device of FIG. 1 as viewed from a rear side.

FIG. 1 is a perspective view of an imaging device including a lid guide mechanism according to an embodiment as viewed from a front side. FIG. 2 is a perspective view of the imaging device of FIG. 1 as viewed from a rear side. In an embodiment, the imaging device is a digital camera.

As shown in FIG. 1 and FIG. 2, the imaging device 1 includes a main body casing 2 which is an example of a support base, and a lid body 3 which is slidably attached to the main body casing 2.

A cover member 4 is attached to an upper part of the main body casing 2. To the cover member 4, there are attached various components such as an internal strobe, an EVF (electronic viewfinder), a power button, a shutter button, a zoom lever, and the like.

Figure 3:
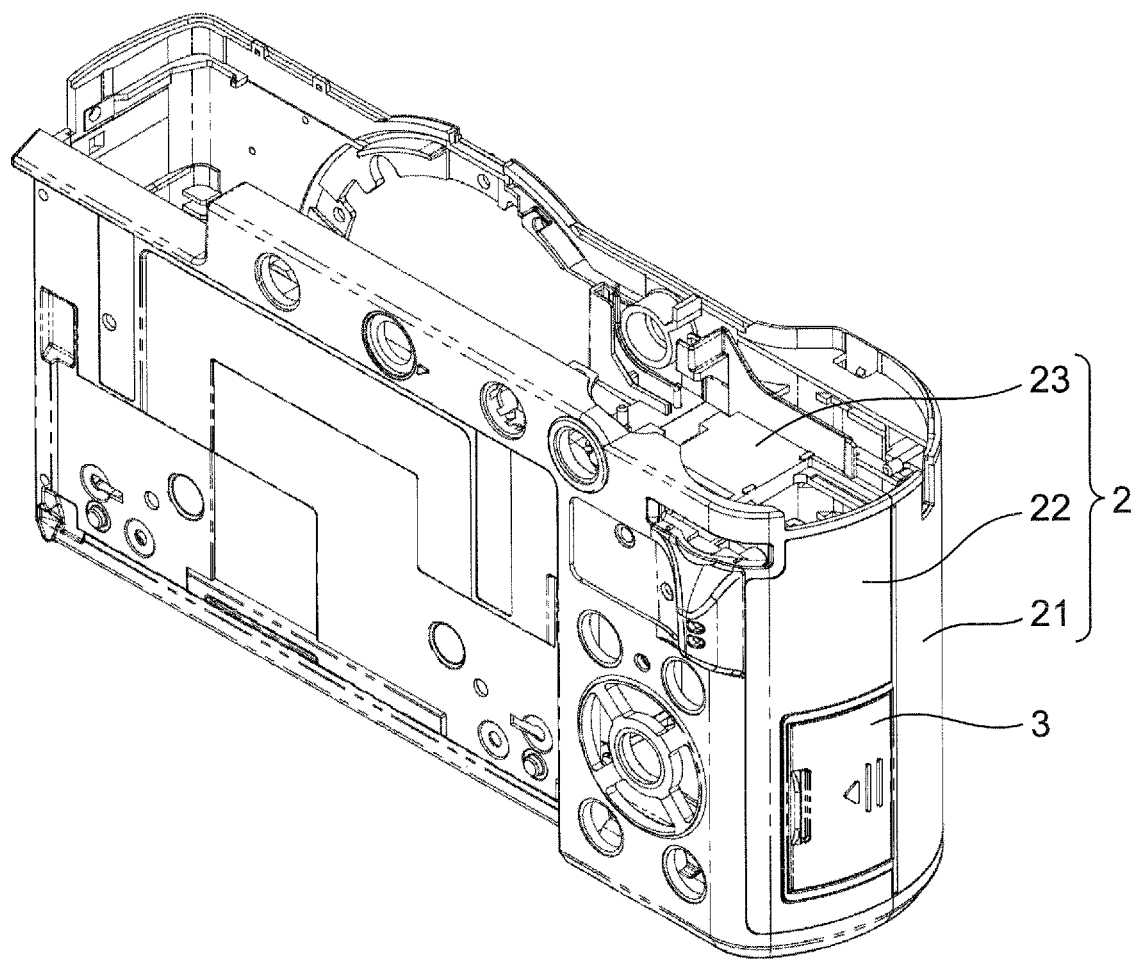
FIG. 3 is an assembled perspective view of a main body casing and a lid body.
Figure 4:
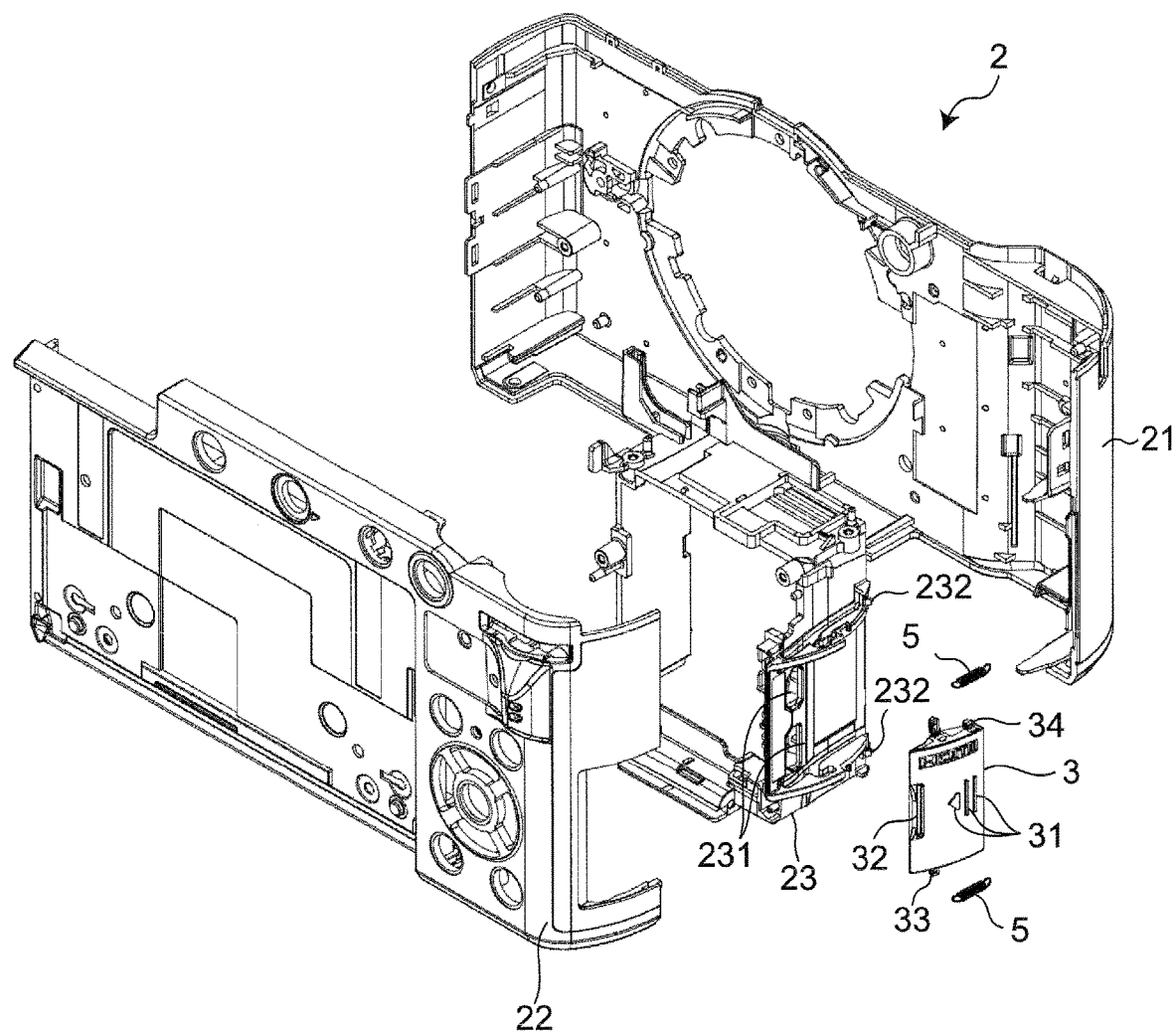
FIG. 4 is an exploded perspective view of the main body casing and the lid body.

FIG. 3 is an assembled perspective view of the main body casing 2 and the lid body 3. FIG. 4 is an exploded perspective view of the main body casing 2 and the lid body 3.

As shown in FIGS. 3 and 4, the main body casing 2 includes: a front casing 21 and a rear casing 22 which constitute an outer shell of the imaging device 1; and a frame 23 disposed between the front casing 21 and the rear casing 22. The lid body 3 is slidably mounted along the frame 23. A pair of springs 5, which are an example of an urging member, are hooked on the lid body 3 and the frame 23. On an outer surface of the lid body 3, there are provided projected parts 31 and a recessed part 32 for catching a finger.

Figure 5:
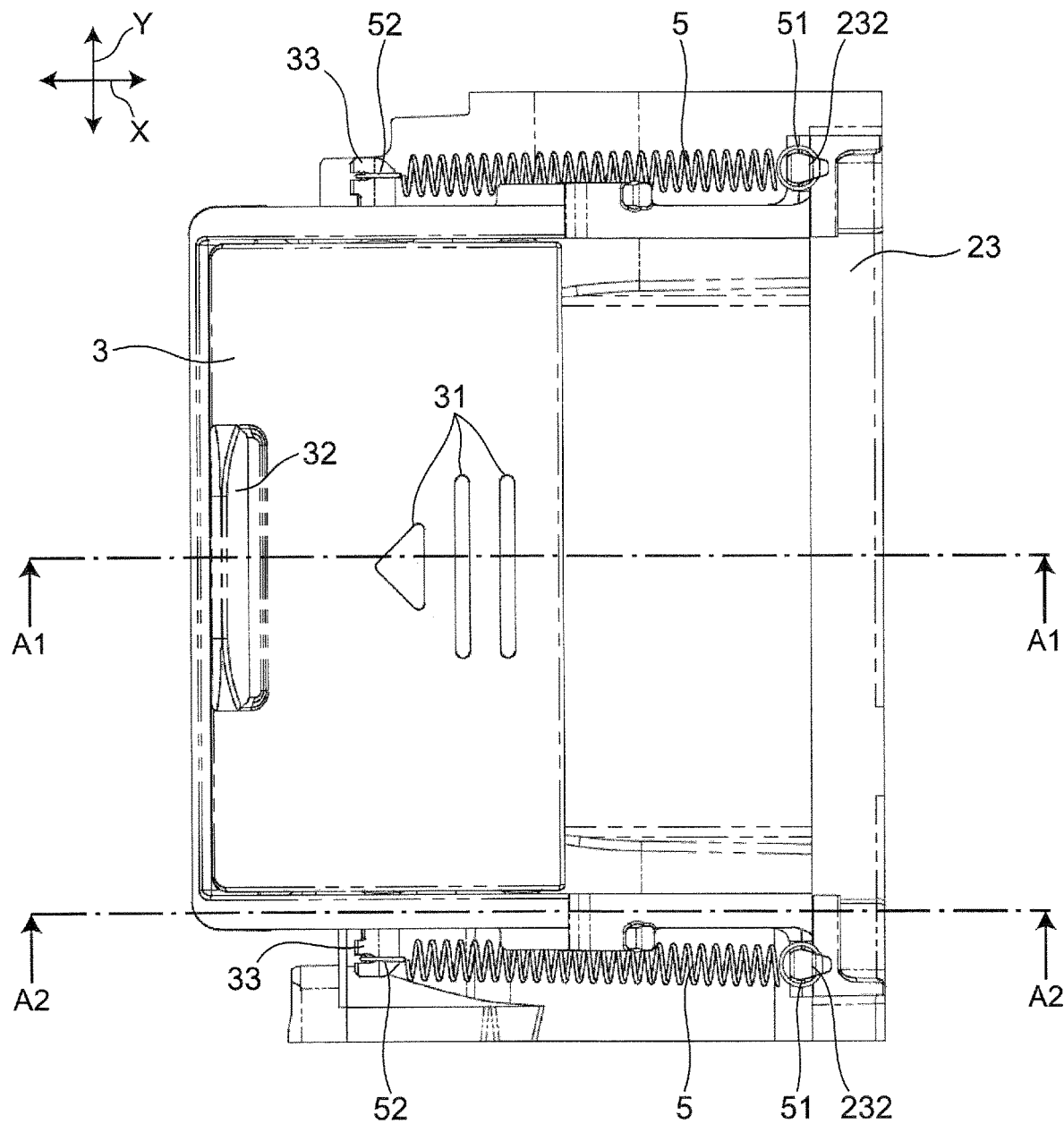
FIG. 5 is a plan view showing a state in which the lid body is attached to a frame.
Figure 6A:
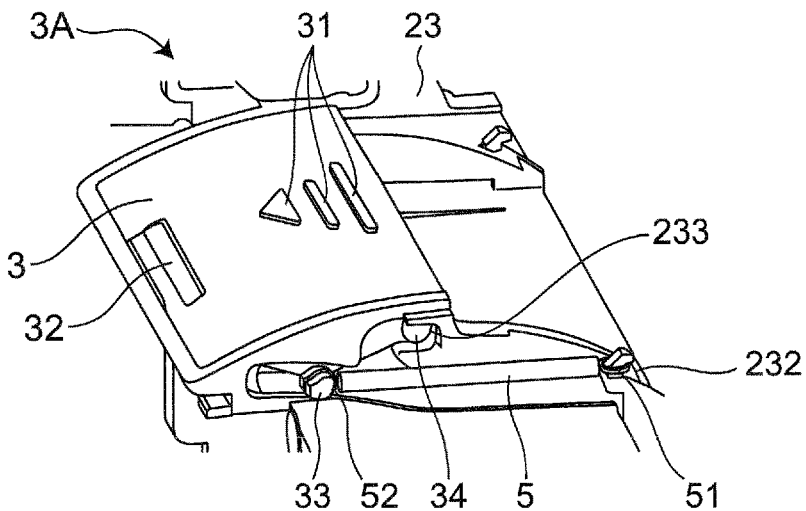
FIG. 6A is a perspective view showing how the lid body slidingly moves along the frame, and shows a state at which the lid body is at a first position.
Figure 6B:
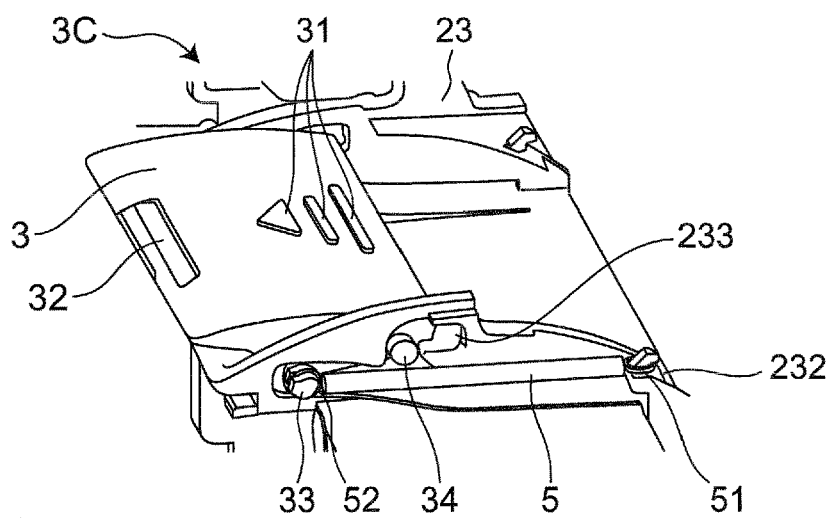
FIG. 6B is a perspective view showing how the lid body slidingly moves along the frame, and shows a state in which the lid body is at a third position.
Figure 6C:
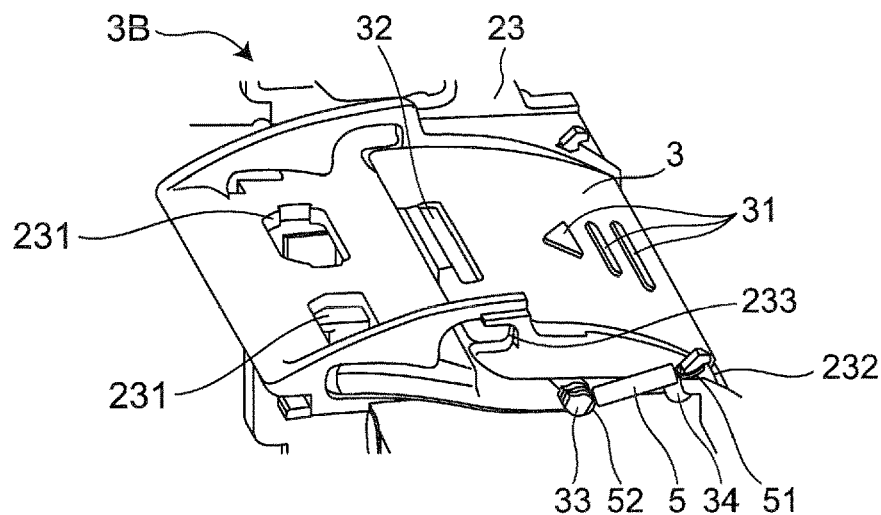
FIG. 6C is a perspective view showing how the lid body slidingly moves along the frame, and shows a state in which the lid body is at a second position.

FIG. 5 is a plan view showing a state in which the lid body 3 is attached to the frame 23. FIGS. 6A to 6C are perspective views each showing how the lid body 3 slidingly moves along the frame 23.

As shown in FIG. 6C, the frame 23 is provided with openings 231. In the embodiment, the frame 23 is provided with two openings 231. In one of the openings 231, an HDMI (registered trademark) connector (see FIG. 12C) is disposed, for example. The HDMI connector is configured such that a plug of an HDMI (registered trademark) cable can be plugged in. When the plug of an HDMI (registered trademark) cable is plugged in the HDMI (registered trademark) connector, it is possible to output a video and/or audio signal to an electronic device or the like through the cable. In the other opening 231, a USB connector (see FIG. 12C) is disposed, for example. The USB connector is configured such that the plug of the USB cable can be plugged in. The plug of the USB cable is plugged in the USB connector, and electric power is supplied through the cable, whereby a battery (not shown) built in the imaging device 1 can be charged.

As shown in FIGS. 6A to 6C, the lid body 3 is configured to be able to open and close the openings 231 by slidingly moving along the frame 23. In the embodiment, the lid body 3 is configured to slidingly move among the first position 3A shown in FIG. 6A, the third position 3C shown in FIG. 6B, and the second position 3B shown in FIG. 6C. The first position 3A, the second position 3B, and the third position 3C are adjacent to the frame 23. That is, the first position 3A, the second position 3B, and the third position 3C are along the surface of the frame 23. The third position 3C is more distant from the second position 3B than the first position 3A. When the lid body 3 is at the first position 3A, the lid body 3 closes the openings 231, and when the lid body 3 is at the second position 3B, the lid body 3 opens the openings 231.

The frame 23 is provided with: an attachment part 232 to which a first end part 51 of the spring 5 is attached; and a locking part 233. The lid body 3 is provided with: a first shaft part 33 to which a second end part 52 of the spring 5 is attached; and a second shaft part 34 which is provided at a position closer to the attachment part 232 than the first shaft part 33 and which is to be locked on the locking part 233 at the first position 3A. The spring 5 is attached to the attachment part 232 and the first shaft part 33 so as to urge the lid body 3 from the first position 3A to the second position 3B. With this arrangement, the lid body 3 is locked on the locking part 233 at the first position 3A without backlash.

The lid body 3 is configured as follows. When the lid body 3 is moved, by an external force, from the first position 3A to the third position 3C against the urging force of the springs 5 so that the locking state between the second shaft part 34 and the locking part 233 is released and when the external force is then released, the lid body 3 is moved to the second position 3B by the urging force of the springs 5. In addition, the lid body 3 is configured as follows. When the lid body 3 is moved, by an external force, from the second position 3B to the third position 3C against the urging force of the springs 5 and when the external force is then released, the lid body 3 is moved to the first position 3A by the urging force of the springs 5.

In the embodiment, the "lid guide mechanism" for guiding the sliding movement of the lid body 3 is configured by the attachment part 232, the locking part 233, the springs 5, the first shaft part 33, and the second shaft part 34. In addition, in the embodiment, the attachment parts 232, the locking parts 233, the springs 5, the first shaft parts 33, and the second shaft parts 34 are each provided in a pair so as to face each other with the lid body 3 therebetween in the Y direction perpendicular to the X direction in which the lid body 3 slidingly moves. As a result, the lid body 3 is evenly supported on both end sides in the Y direction, and is guided so as to slidingly move in the X direction more reliably.

Next, with reference to FIGS. 7A to 12D, a description will be made on how the lid body 3 moves from the first position 3A (see FIG. 6A) to the second position 3B (see FIG. 6C).

Figure 12A:
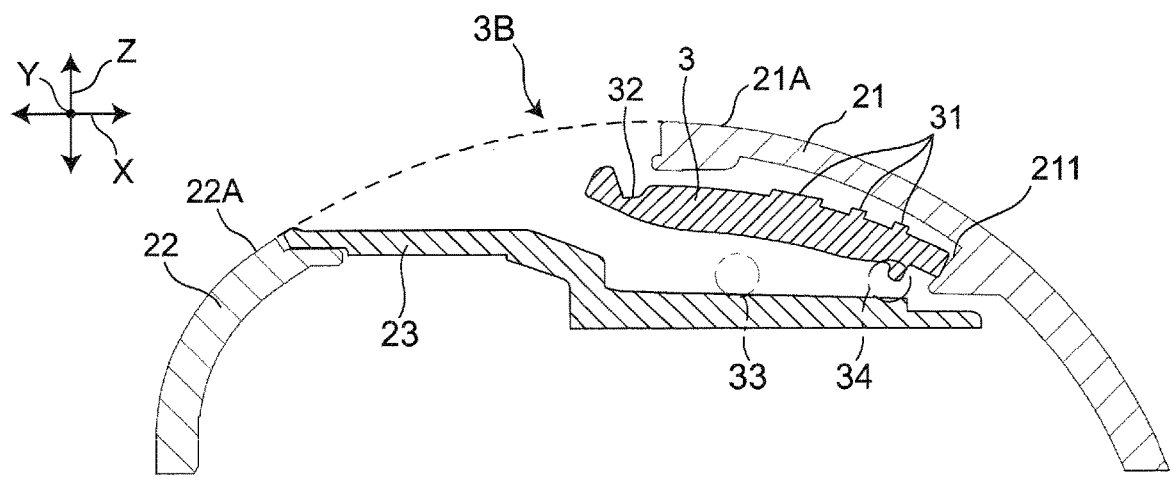
FIG. 12A is a cross-sectional view taken along line A1-A1 in FIG. 5, and shows a state in which the lid body is at the second position.
Figure 12B:
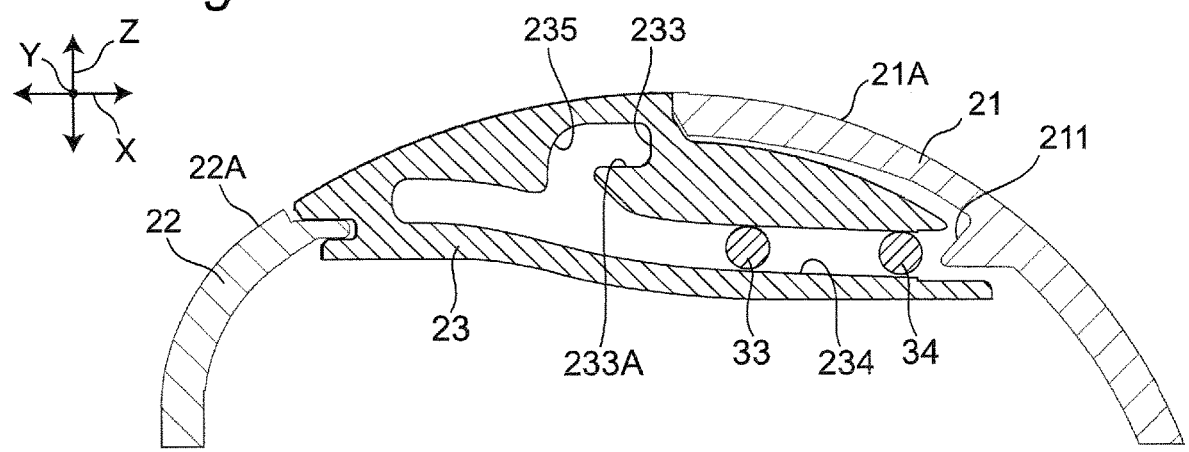
FIG. 12B is a cross-sectional view taken along line A2-A2 in FIG. 5, and shows the state in which the lid body is at the second position.
Figure 12C:
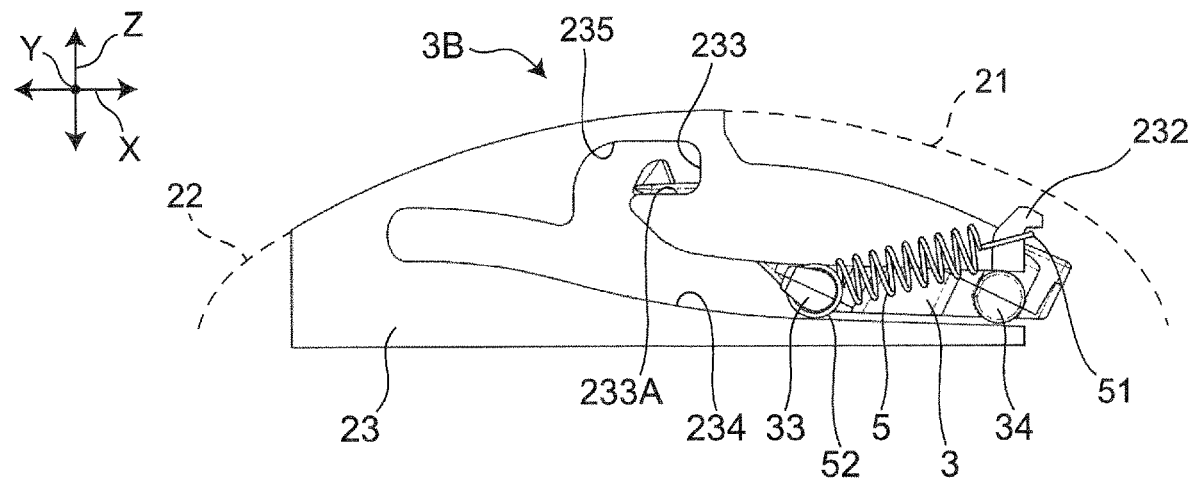
FIG. 12C is a side view showing the configuration of the members related to the sliding movement of the lid body, and shows the state in which the lid body is at the second position.
Figure 12D:
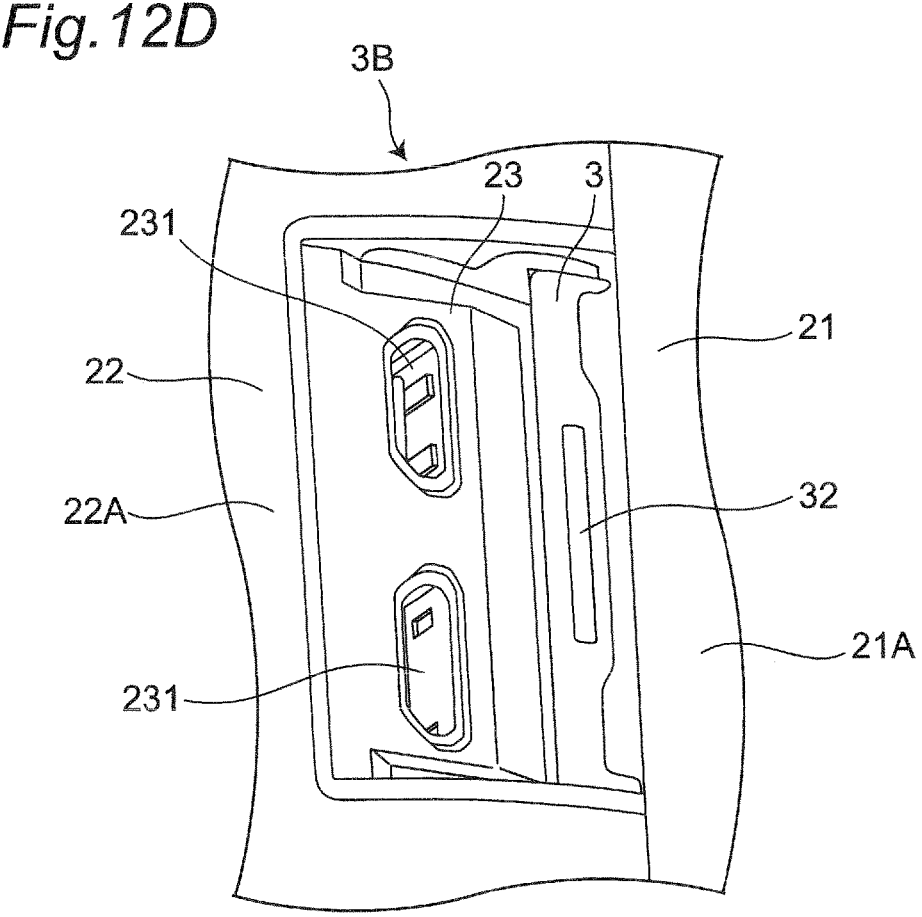
FIG. 12D is a perspective view showing the state in which the lid body is at the second position.

FIGS. 7A, 8A, 9A, 10A, 11A, and 12A are cross-sectional views each taken along line A1-A1 in FIG. 5. FIGS. 7B, 8B, 9B, 10B, 11B, and 12B are cross-sectional views each taken along line A2-A2 in FIG. 5. FIGS. 7C, 9C, and 12C are side views each showing the configuration of the members related to the sliding movement of the lid body 3. FIG. 12D is a perspective view showing a state where the lid body 3 is at the second position 3B.

In the embodiment, the frame 23 is provided with a first guide groove 234 for guiding the first shaft part 33 and the second shaft part 34 so that the lid body 3 moves between the second position 3B and the third position 3C. In the frame 23, a second guide groove 235 is provided to branch from the first guide groove 234 and to extend to the locking part 233, and the second guide groove 235 guides the second shaft part 34 so that the lid body 3 moves between the first position 3A and the third position 3C.

The second guide groove 235 is provided inside, in the front casing 21 and the rear casing 22, of the outer surfaces of the front casing 21 and the rear casing 22, which are the outer surface of the support base. The first guide groove 234 is provided inside, in the front casing 21 and the rear casing 22, of the second guide groove 235.

Figure 7A:
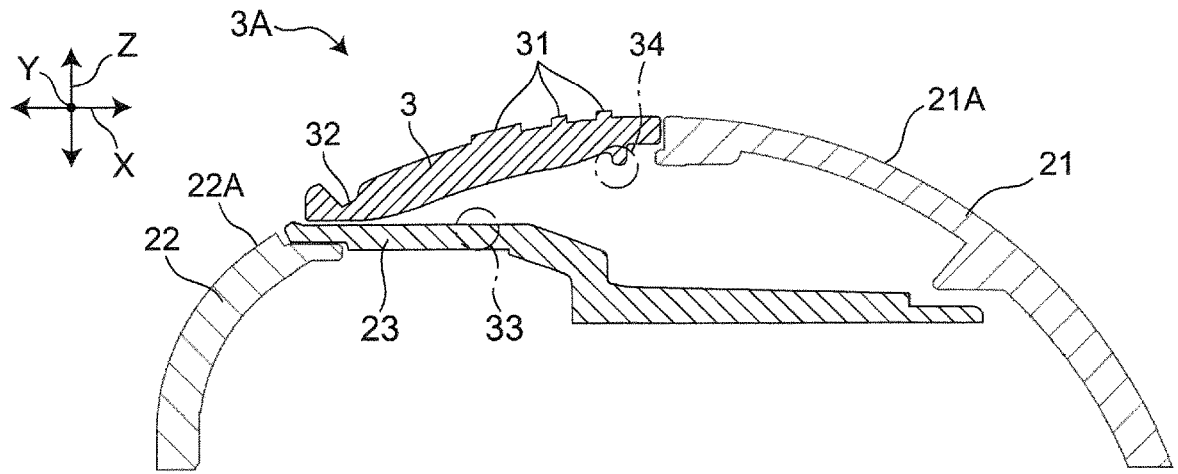
FIG. 7A is a cross-sectional view taken along line A1-A1 in FIG. 5, and shows a state in which the lid body is at the first position.
Figure 7B:
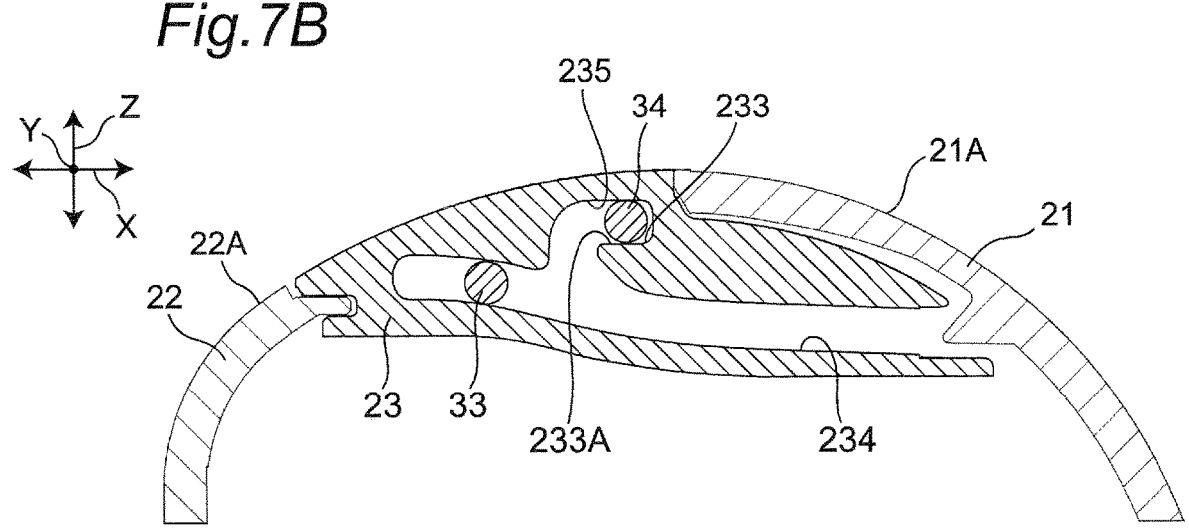
FIG. 7B is a cross-sectional view taken along line A2-A2 in FIG. 5, and shows the state in which the lid body is at the first position.
Figure 7C:
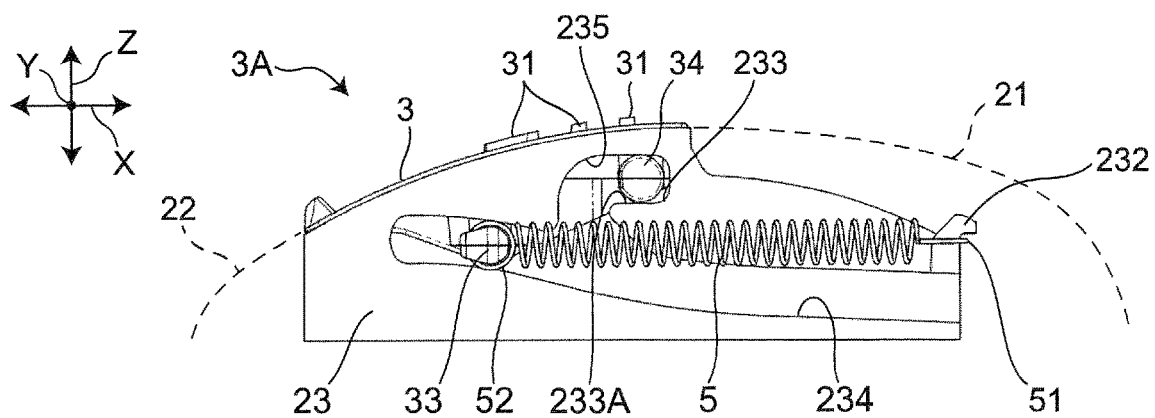
FIG. 7C is a side view showing a configuration of the members related to sliding movement of the lid body, and shows the state in which the lid body is at the first position.

As shown in FIGS. 7A and 7C, the lid body 3 is configured to be flush with or substantially flush with the outer surfaces of the front casing 21 and the rear casing 22 when the lid body 3 is at the first position 3A. In the embodiment, the outer surface of the lid body 3 is curved so as to be flush or substantially flush with the curved surfaces 21A and 22A constituting a part of the outer surfaces of the front casing 21 and the rear casing 22.

As shown in FIGS. 7B and 7C, when the lid body 3 is at the first position 3A, the second shaft part 34 is locked on the locking part 233. The locking part 233 extends in parallel or substantially in parallel to the X direction, in which the lid body 3 moves from the first position 3A to the third position 3C, and the locking part 233 has a support surface 233A which supports the second shaft part 34 from inside of the frame 23. With this arrangement, even when an external force is unintentionally applied to the lid body 3 in the Z direction (the thickness direction of the frame 23) orthogonal to the X direction and the Y direction, the support surface 233A prevents the second shaft part 34 from moving to the first guide groove 234.

When the lid body 3 is moved from the first position 3A to the second position 3B, a finger is first put on the projected parts 31 of the lid body 3, and an external force is applied to the lid body 3 so that the lid body 3 moves from the first position 3A to the third position 3C against the urging force of the springs 5. By this operation, as shown in FIGS. 8A and 8B, the first shaft part 33 and the second shaft part 34 move in the X direction in the first guide groove 234 and the second guide groove 235 so as to move away from the locking part 233.

Figure 8A:
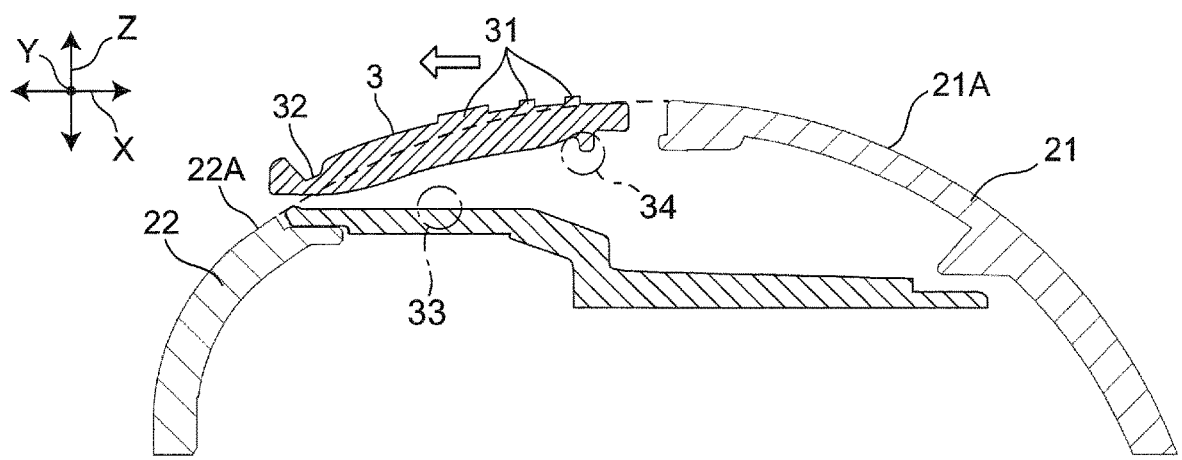
FIG. 8A is a cross-sectional view taken along line A1-A1 in FIG. 5, and shows how the lid body moves from the first position toward the third position.
Figure 8B:
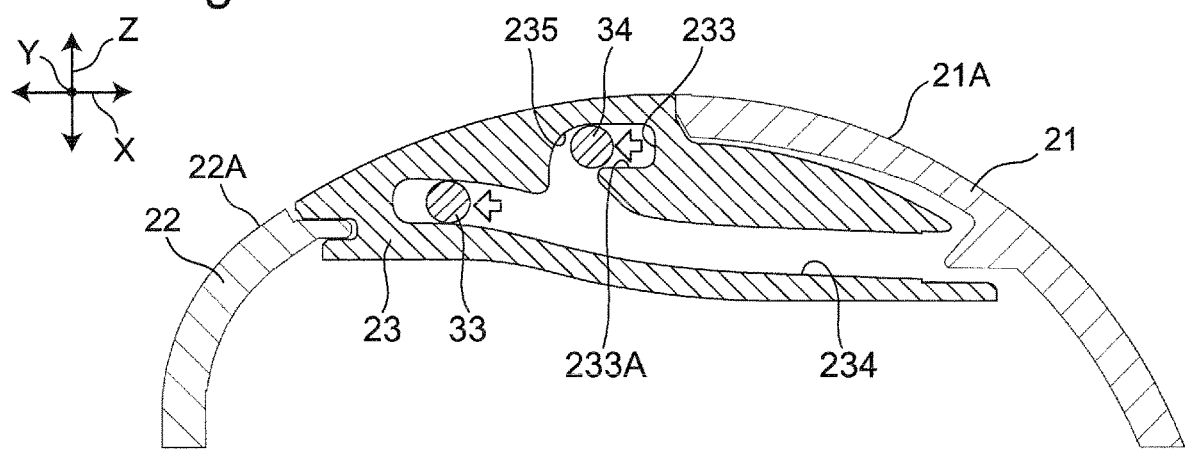
FIG. 8B is a cross-sectional view taken along line A2-A2 in FIG. 5, and shows how the lid body moves from the first position toward the third position.
Figure 9A:
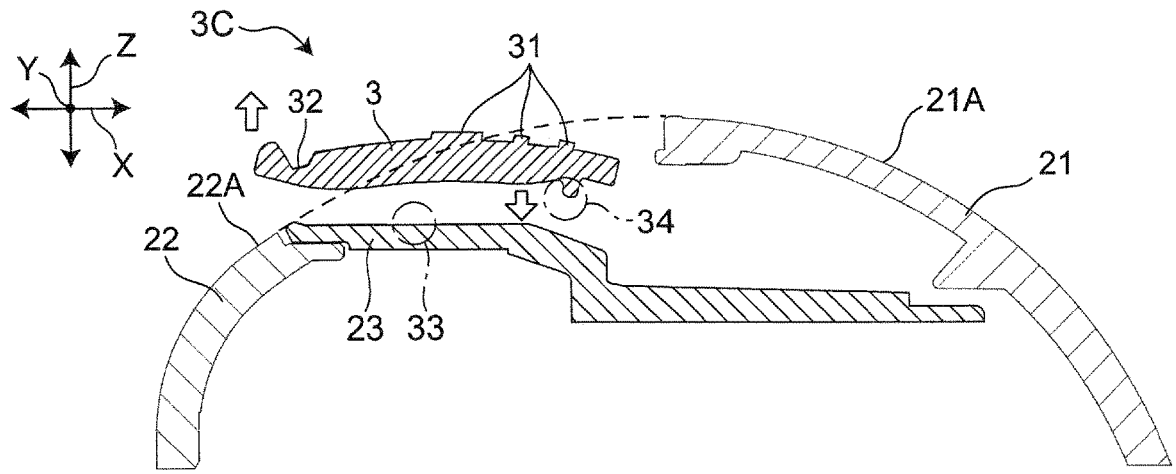
FIG. 9A is a cross-sectional view taken along line A1-A1 in FIG. 5, and shows a state in which the lid body is at the third position.
Figure 9B:
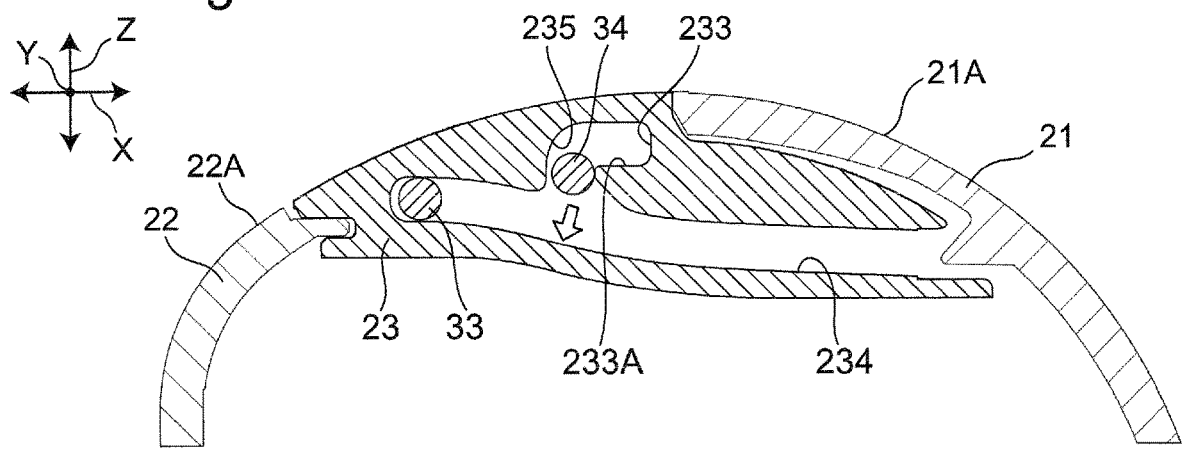
FIG. 9B is a cross-sectional view taken along line A2-A2 in FIG. 5, and shows the state in which the lid body is at the third position.
Figure 9C:
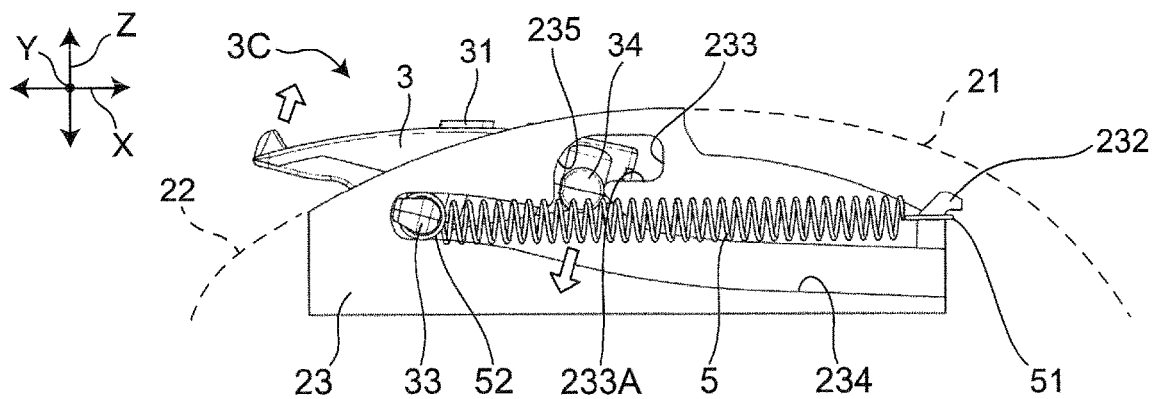
FIG. 9C is a side view showing the configuration of the members related to the sliding movement of the lid body, and shows the state in which the lid body is at the third position.

When the first shaft part 33 and the second shaft part 34 are further moved in the X direction so as to move further away from the locking part 233 as shown in FIGS. 8A and 8B and the lid body 3 then reaches the third position 3C as shown in FIGS. 9A to 9C, the locking state between the second shaft part 34 and the locking part 233 is released. That is, the support of the second shaft part 34 by the support surface 233A is released. By this operation, the second shaft part 34 is moved from the second guide groove 235 to the first guide groove 234. The second guide groove 235 branches from the first guide groove 234 in a region where the second shaft part 34 is located when the lid body 3 is at the third position 3C.

Figure 10A:
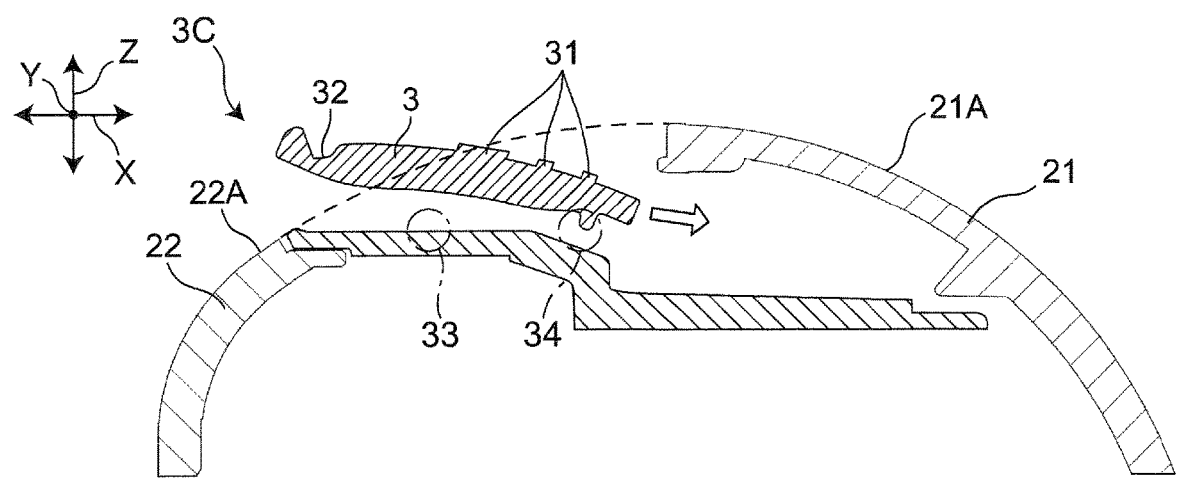
FIG. 10A is a cross-sectional view taken along line A1-A1 in FIG. 5, and shows how the lid body moves from the third position toward the second position.
Figure 10B:
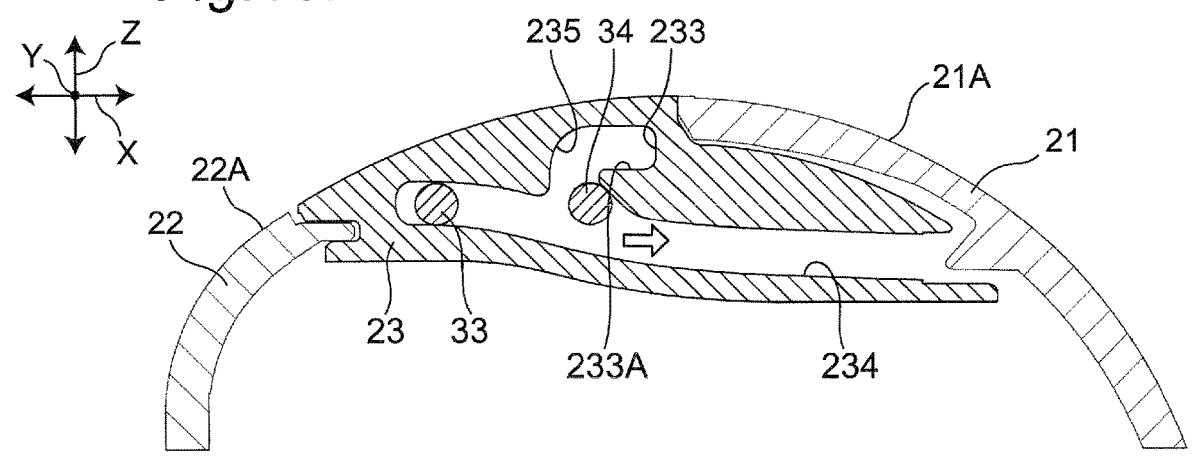
FIG. 10B is a cross-sectional view taken along line A2-A2 in FIG. 5, and shows how the lid body moves from the third position toward the second position.
Figure 11A:
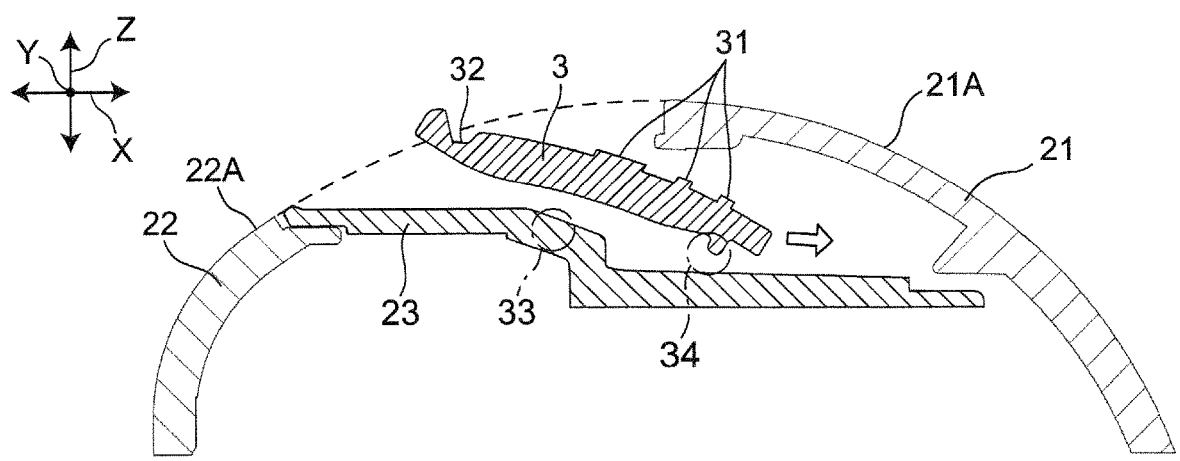
FIG. 11A is a cross-sectional view taken along line A1-A1 in FIG. 5, and shows how the lid body moves from the third position toward the second position.
Figure 11B:
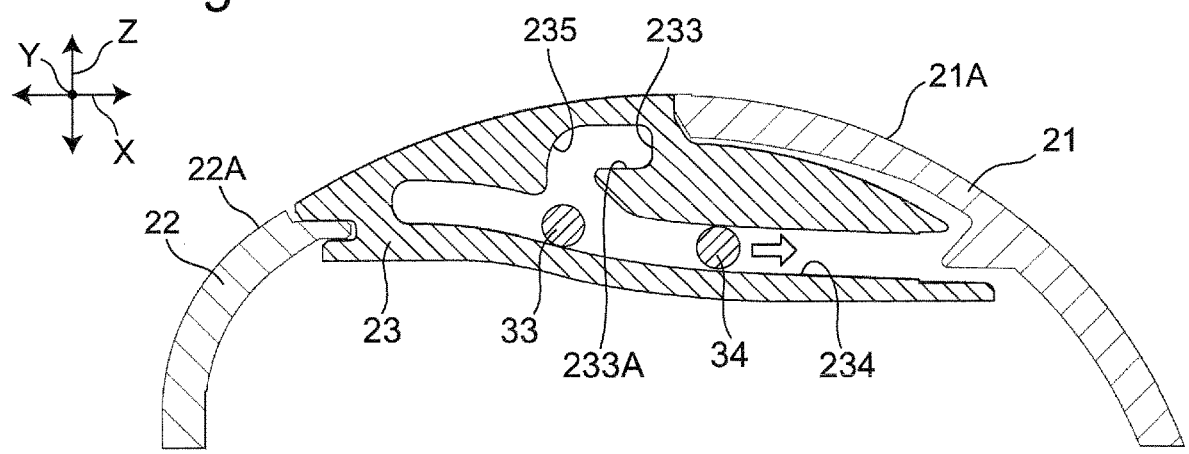
FIG. 11B is a cross-sectional view taken along line A2-A2 in FIG. 5, and shows how the lid body moves from the third position toward the second position.

When the lid body 3 is slidingly moved in the X direction by an external force, the external force is normally applied to the lid body 3 also in the Z direction so that the lid body 3 is pressed to the inside of the frame 23. Further, in the embodiment, since the outer surface of the lid body 3 is curved, an external force in the Z direction is likely to occur. By the external force in the Z direction, the lid body 3 is rotated around the first shaft part 33 in the first guide groove 234, and as shown in FIGS. 10A and 10B, the second shaft part 34 easily moves from the second guide groove 235 to the first guide groove 234.

When the lid body 3 is at the third position 3C, the urging force of the springs 5 is maximum or almost maximum. When the external force is released in this state, the first shaft part 33 is pulled, by the urging force of the springs 5, in the X direction so as to move closer to the attachment part 232 as shown in FIGS. 10A, 10B, 11A, and 11B. As a result, as shown in FIGS. 12A to 12D, the lid body 3 moves to the second position 3B. At this time, the urging force of the springs 5 is minimum or almost minimum. At this time, as shown in FIG. 12D, the lid body 3 is housed inside the front casing 21 except a part, on the first shaft part 33 side, having the recessed part 32. At this time, the end part of the lid body 3 on the second shaft part 34 side are in contact with a stopper 211 provided inside the front casing 21 as shown in FIG. 12A, and the end part of the lid body 3 is held at the third position 3C without backlash by the urging force of the springs 5.

Next, with reference to FIGS. 7A to 7C and FIGS. 13A to 15B, a description will be made more specifically on how the lid body 3 moves from the second position 3B (see FIG. 6C) to the first position 3A (see FIG. 6A).

Figure 13A:
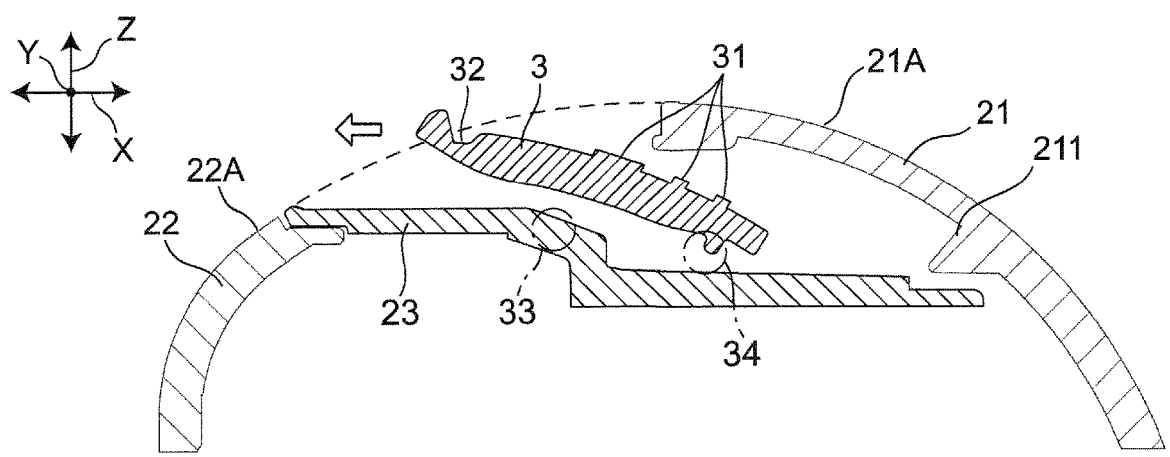
FIG. 13A is a cross-sectional view taken along line A1-A1 in FIG. 5, and shows how the lid body moves from the second position toward the third position.
Figure 13B:
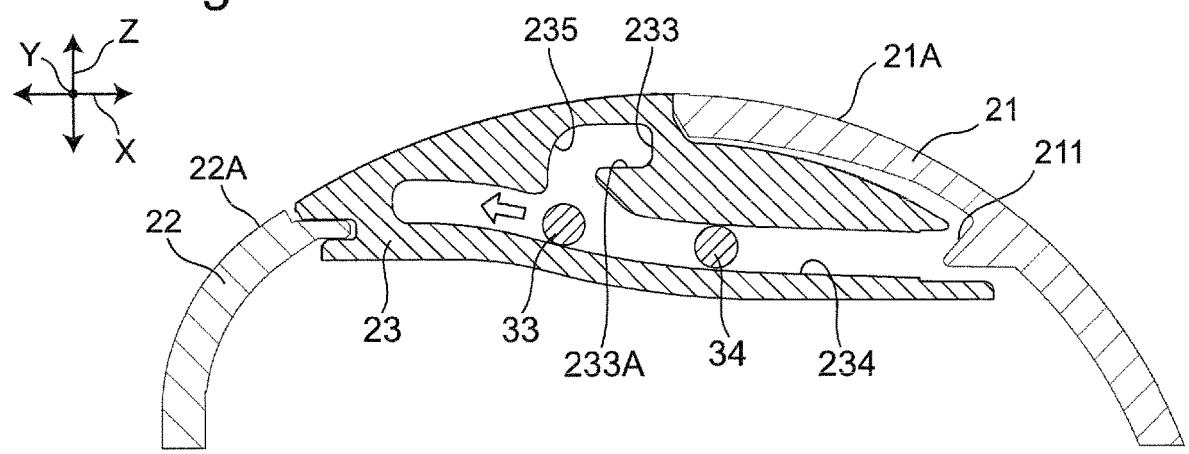
FIG. 13B is a cross-sectional view taken along line A2-A2 in FIG. 5, and shows how the lid body moves from the second position toward the third position.
Figure 14A:
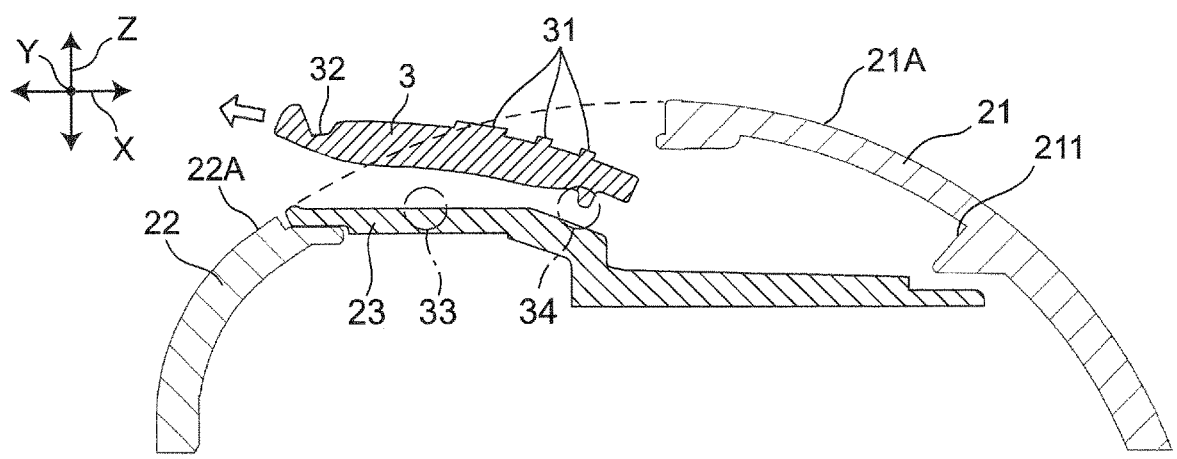
FIG. 14A is a cross-sectional view taken along line A1-A1 in FIG. 5, and shows how the lid body moves from the second position toward the third position.
Figure 14B:
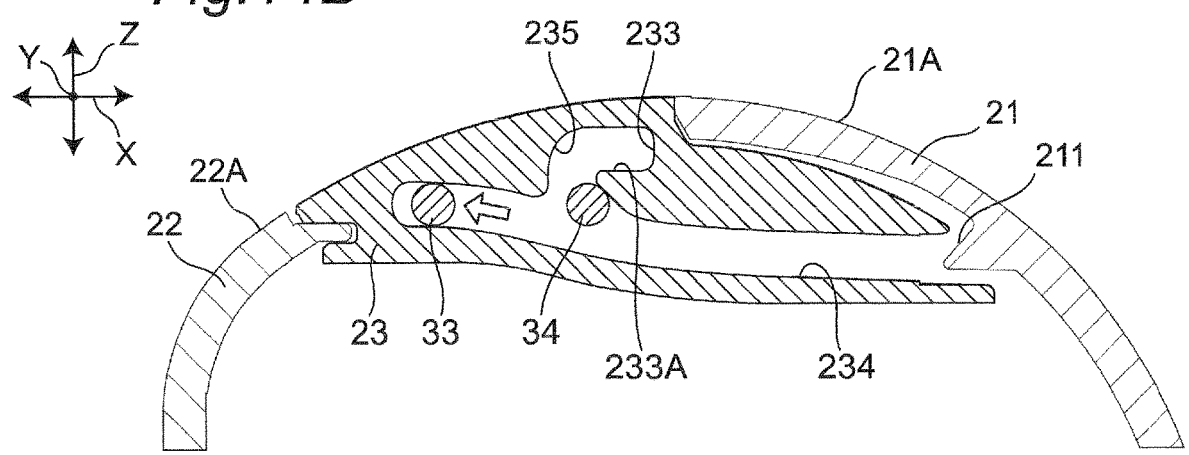
FIG. 14B is a cross-sectional view taken along line A2-A2 in FIG. 5, and shows how the lid body moves from the second position toward the third position.
Figure 15A:
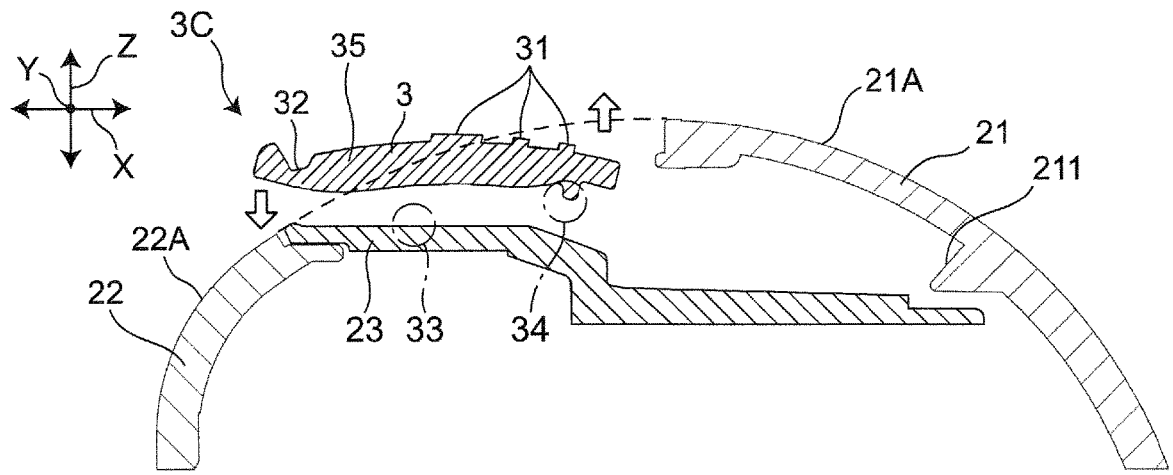
FIG. 15A is a cross-sectional view taken along line A1-A1 in FIG. 5, and shows the state in which the lid body is at the third position.
Figure 15B:
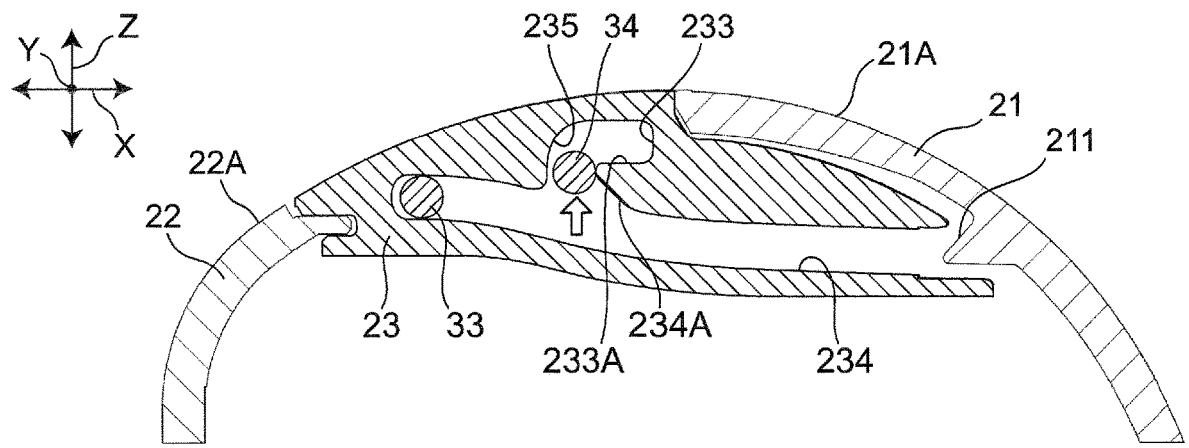
FIG. 15B is a cross-sectional view taken along line A2-A2 in FIG. 5, and shows the state in which the lid body is at the third position.
Figure 15C:
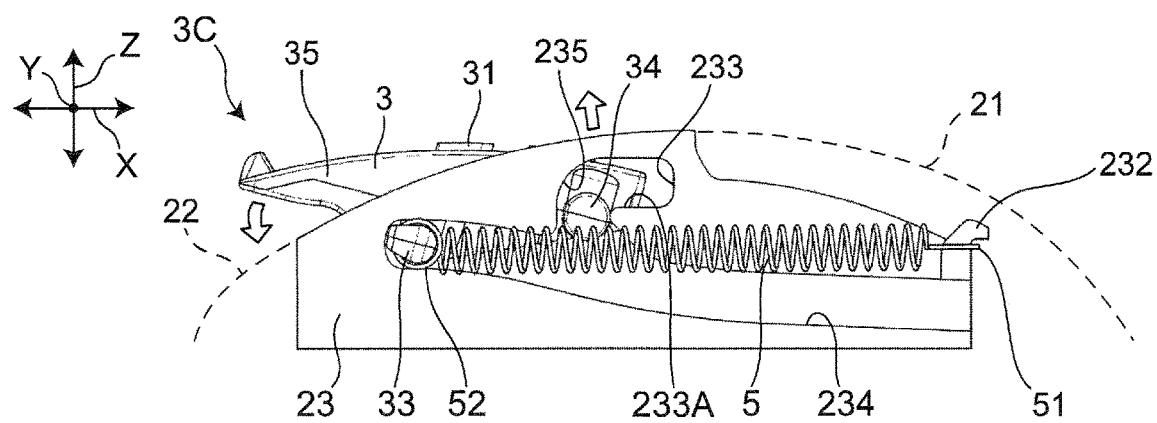
FIG. 15C is a side view showing the configuration of the members related to the sliding movement of the lid body, and shows the state in which the lid body is at the third position.

FIGS. 13A, 14A, and 15A are cross-sectional views each taken along line A1-A1 in FIG. 5. FIGS. 13B, 14B, and 15B are cross-sectional views each taken along line A2-A2 in FIG. 5. FIG. 15C is a side view showing the configuration of the members related to the sliding movement of the lid body 3.

When the lid body 3 is moved from the second position 3B (see FIGS. 12A to 12D) to the first position 3A, a finger is first put on the recessed part 32 of the lid body 3, and an external force is applied to the lid body 3 so that the lid body 3 moves from the second position 3B to the third position 3C against the urging force of the springs 5. By this operation, as shown in FIGS. 13A, 13B, 14A, and 14B, the first shaft part 33 and the second shaft part 34 are moved in the X direction in the first guide groove 234 so as to move away from the stopper 211.

When the first shaft part 33 and the second shaft part 34 are further moved in the X direction from the state shown in FIGS. 14A and 14B and the lid body 3 reaches the third position 3C, as shown in FIGS. 15A to 15C, the second shaft part 34 moves from the first guide groove 234 to the second guide groove 235.

Note that, in the embodiment, the first guide groove 234 moves the second shaft part 34 outside, with respect to the frame 23, of the springs 5 when the lid body 3 moves from the second position 3B to the third position 3C. As shown in FIG. 15B, the first guide groove 234 has a slope 234A on a part at which the first guide groove 234 is connected to the second guide groove 235, and the slope 234A is inclined such that a surface of the slope 234A is closer to the support surface 233A as the surface of the slope 234A is more distant from the stopper 211. That is, the slope 234A is formed to be inclined with respect to the X direction and the Z direction. Further, the support surface 233A and the slope 234A are connected at an acute angle, and the connection part between the support surface 233A and the slope 234A (corner parts) is rounded. With this arrangement, the urging force of the springs 5 rotates the lid body 3 around the first shaft part 33, so that the second shaft part 34 easily moves from the first guide groove 234 to the second guide groove 235. Note that if the slope 234A is formed to be a flat surface extending in the Z direction, the second shaft part 34 is likely to stop on the flat surface, and it is difficult for the second shaft part 34 to move from the first guide groove 234 to the second guide groove 235.

In addition, in the embodiment, as shown in FIGS. 15A and 15C, the lid body 3 has a projection part 35 projecting on a side more distant from the attachment part 232 than the first shaft part 33. The projection part 35 is a part on one end side, in the X direction, of the lid body 3 in which the recessed part 32 is provided. When a finger is put on the recessed part 32 and the lid body 3 is slidingly moved from the second position 3B to the third position 3C, an external force is usually applied to the projection part 35 in the Z direction so that the projection part 35 is pressed toward the inside of the frame 23. Further, in the embodiment, since the outer surface of the lid body 3 is curved, an external force in the Z direction is likely to occur. Due to the external force in the Z direction, the lid body 3 rotates around the first shaft part 33 in the first guide groove 234 as a center, and the second shaft part 34 more easily moves from the first guide groove 234 to the second guide groove 235.

When the external force is released in this state, the urging force of the springs 5 pulls the second shaft part 34 in the X direction so that the second shaft part 34 moves closer to the locking part 233. As a result, as shown in FIGS. 7A to 7C, the lid body 3 moves to the first position 3A.

According to the embodiment, when the lid body 3 is moved, by the external force, to the third position 3C against the urging force of the springs 5 so that the locking state between the second shaft part 34 and the locking part 233 is released and when the external force is then released, the lid body 3 is moved to the second position 3B by the urging force of the springs 5. With this arrangement, the lid body 3 can be easily opened by only slidingly moving the lid body 3 from the first position 3A to the third position 3C. Further, since the lid body 3 slidingly moves to the second position adjacent to the frame 23, it is possible to prevent the lid body 3 in the open state from obstructing other operations.

Further, according to the embodiment, the lid body 3 is configured as follows. When the lid body 3 is moved, by an external force, from the second position 3B to the third position 3C against the urging force of the springs 5 and when the external force is then released, the lid body 3 is moved to the first position 3A by the urging force of the springs 5. With this arrangement, the lid body 3 can be easily closed by only slidingly moving the lid body 3 from the second position 3B to the third position 3C.

Further, according to the embodiment, the lid body 3 is configured to be flush with or substantially flush with the outer surfaces of the front casing 21 and the rear casing 22 when the lid body 3 is at the first position 3A. Further, when the lid body 3 is at the second position 3B, the lid body 3 is housed inside the front casing 21 except the part on the first shaft part 33 side. This arrangement can further prevent the lid body 3 from obstructing other operations.

It should be noted that the present disclosure is not limited to the above embodiment, and can be practiced in other various modes. For example, in the above description, when the lid body 3 is at the second position 3B, the lid body 3 is housed inside the front casing 21 except the part on the first shaft part 33 side. However, the present disclosure is not limited to this arrangement. For example, the lid body 3 may be adjacent to the outer side of the outer surface of the front casing 21 when the lid body 3 is at the second position 3B. That is, the lid body 3 may be configured to slidingly move on the outer surface of the main body casing 2.

Further, in the above description, the lid body 3 closes the two openings 231 when the lid body 3 is at the first position 3A, and opens the two openings 231 when the lid body 3 is at the second position 3B. However, the present disclosure is not limited to this arrangement. For example, the two openings 231 may be opened when the lid body 3 is at the first position 3A, and the two openings 231 may be closed when the lid body 3 is at the second position 3B.

Figure 16:
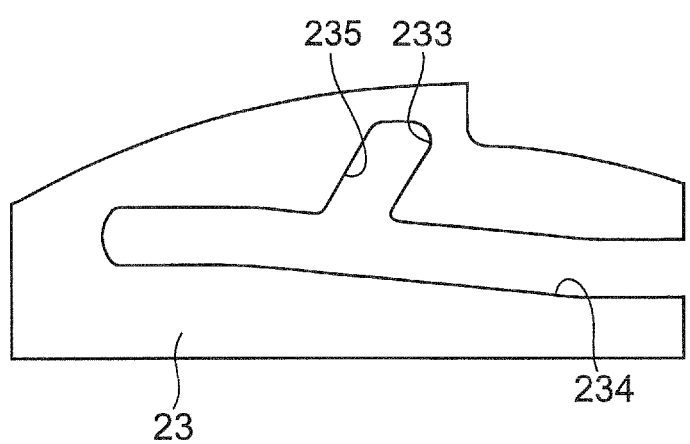
FIG. 16 is a side view showing a modification example of a locking part.

Further, in the above description, the locking part 233 has the support surface 233A extending in the X direction, but the present disclosure is not limited to this arrangement. For example, as shown in FIG. 16, the locking part 233 may be configured as an end part of the second guide groove 235 extending in a direction intersecting the first guide groove 234.

The embodiment is described in the above as examples of the technique in the present disclosure. For that purpose, the accompanying drawings and the detailed description are provided. Therefore, the components illustrated in the attached drawings and described in the detailed description may include, to exemplify the technique, not only components essential for solving the problem but also components not essential for solving the problem. For this reason, it should not be immediately recognized that those unnecessary components are necessary only because those unnecessary components are described in the attached drawings and the detailed description.

In addition, because the above exemplary embodiment is for illustrating the technique in the present disclosure, various modifications, replacements, additions, removals, or the like can be made without departing from the scope of the claims or the equivalent thereto.

INDUSTRIAL APPLICABILITY

With the lid guide mechanism according to the present disclosure, it is possible to more easily open the lid body and to prevent the lid body in the open state from obstructing other operations, and the lid guide mechanism according to the present disclosure is useful for not only imaging devices but also other electronic devices such as televisions and personal computers.

The invention claimed is:
1. A lid guide mechanism comprising:
  a support base;
  a lid body which slidingly moves between a first position and a second position which are adjacent to the support base;
  an urging member which urges the lid body from the first position toward the second position,
  wherein the support base includes: an attachment part to which a first end part of the urging member is attached; and a locking part,
  the lid body includes: a first shaft part to which a second end part of the urging member is attached; and a second shaft part which is provided at a position closer to the attachment part than the first shaft part and is locked on the locking part at the first position, and
  wherein the support base is configured to guide the lid body such that when the lid body is moved, by an external force, to a third position more distant from the second position than the first position against an urging force of the urging member so that a locking state between the second shaft part and the locking part is released, the lid body is moved to the second position by the urging force of the urging member upon release of the external force.

2. The lid guide mechanism according to claim 1, wherein the support base is configured to guide the lid body such that when the lid body is moved, by an external force, from the second position to the third position against the urging force of the urging member, the lid body is moved to the first position by the urging force of the urging member upon release of the external force.

3. The lid guide mechanism according to claim 1, wherein when the lid body is at the first position, the lid body is flush or substantially flush with an outer surface of the support base, and when the lid body is at the second position, the lid body is housed inside the support base except a part on a first shaft part side.

4. The lid guide mechanism according to claim 1, wherein the locking part extends parallel or substantially parallel to a moving direction of the lid body from the first position to the third position, and the locking part includes a support surface which supports the second shaft part from inside of the support base.

5. The lid guide mechanism according to claim 1, wherein the support base includes:
   a first guide groove which guides the first shaft part and the second shaft part so that the lid body moves between the second position and the third position; and
   a second guide groove which branches from the first guide groove and extends to the locking part, and guides the second shaft part so that the lid body moves between the first position and the third position.

6. The lid guide mechanism according to claim 5, wherein the second guide groove branches from the first guide groove in a vicinity of a region in which the second shaft part is located when the lid body is at the third position.

7. The lid guide mechanism according to claim 5, wherein
   the second guide groove is provided inside, in the support base, with respect to an outer surface of the support base, and
   the first guide groove is provided inside, in the support base, with respect to the second guide groove.

8. The lid guide mechanism according to claim 5, wherein when the lid body moves from the second position to the third position, the first guide groove moves the second shaft part outside, with respect to the support base, of the urging member.

9. The lid guide mechanism according to claim 5, wherein the lid body includes a projection part projecting on a side more distant from the attachment part than the first shaft part, the projection part rotates around the first shaft part by being moved from the second position to the third position against the urging force of the urging member while being pressed toward inside of the support base, and the second shaft part moves from the first guide groove to the second guide groove.

10. The lid guide mechanism according to claim 9, wherein an outer surface of the lid body is curved so that the outer surface of the lid body is flush or substantially flush with a curved surface constituting a part of the outer surface of the support base.

11. An imaging device comprising the lid guide mechanism according to claim 1.

* * * * *